(12) United States Patent
Yoshimura et al.

(10) Patent No.: US 7,730,163 B2
(45) Date of Patent: Jun. 1, 2010

(54) MULTIMEDIA MESSAGE SERVICE APPARATUS

(75) Inventors: Takashi Yoshimura, Minato-ku (JP); Shinichi Akahoshi, Minato-ku (JP)

(73) Assignee: Vodafone Group PLC, Newbury, Berkshire (GB)

( * ) Notice: Subject to any disclaimer, the term of this patent is extended or adjusted under 35 U.S.C. 154(b) by 659 days.

(21) Appl. No.: 10/523,904

(22) PCT Filed: Mar. 22, 2004

(86) PCT No.: PCT/JP2004/003865

§ 371 (c)(1),
(2), (4) Date: Jan. 28, 2005

(87) PCT Pub. No.: WO2004/100597

PCT Pub. Date: Nov. 18, 2004

(65) Prior Publication Data

US 2006/0053197 A1    Mar. 9, 2006

(51) Int. Cl.
*G06F 15/16* (2006.01)
*G06F 15/177* (2006.01)
*H04M 1/64* (2006.01)
*H04M 11/00* (2006.01)
*H04B 7/15* (2006.01)
*H04W 4/00* (2009.01)

(52) U.S. Cl. .............. 709/219; 709/220; 709/228; 709/245; 379/88.17; 379/100.09; 455/11.1; 455/406; 455/432.1; 455/433; 455/435.1; 455/435.2

(58) Field of Classification Search .............. 455/411, 455/433, 558, 11.1, 406, 432, 1, 435.1, 435.2; 379/142.01, 88.17, 100.09
See application file for complete search history.

(56) References Cited

U.S. PATENT DOCUMENTS

| | | | |
|---|---|---|---|
| 6,947,738 B2 * | 9/2005 | Skog et al. ............... | 455/426.1 |
| 7,027,582 B2 * | 4/2006 | Khello et al. ........... | 379/220.01 |
| 7,337,212 B2 * | 2/2008 | Goto ......................... | 709/206 |
| 2004/0156495 A1 * | 8/2004 | Chava et al. ............... | 379/392 |
| 2007/0042779 A1 * | 2/2007 | Eikkula ..................... | 455/445 |

FOREIGN PATENT DOCUMENTS

| | | | |
|---|---|---|---|
| EP | 1215858 A1 | | 6/2001 |
| EP | 1 215 858 | * | 6/2002 |
| JP | 2002-171280 A | | 6/2002 |
| WO | WO 01/03446 A1 | | 11/2001 |

* cited by examiner

*Primary Examiner*—Ashok B Patel
(74) *Attorney, Agent, or Firm*—Muirhead and Saturnelli, LLC

(57) ABSTRACT

A system that services international multimedia message calls includes an MMSC that determines from the destination MSISDN of the header of a multimedia message that the call is an international transmission and, at the same time, determines whether or not the forwarding destination supports number portability, by referencing the MSISDN routing table. If number portability is supported, it acquires the IMSI corresponding to the destination MSISDN by inquiring the HLR. Next, the MMSC acquires the domain name of the MMSE of the forwarding destination by referencing the IMSI routing table from the IMSI that has thus been acquired and forwards the multimedia message to this MMSE. If number portability is not supported, it forwards the multimedia message to the MMSE of the domain name acquired by referencing the MSISDN routing table.

20 Claims, 2 Drawing Sheets

| Prefix |
|---|
| + |
| 00 |
| 010 |

FIG.2

| Country code | Operator code | Type | Domain name |
|---|---|---|---|
| 353 | 87 | No MNP | mmse.xxxx.je |
| 82 | 16 | No MNP | mmse.xxxx.kr |
| 44 | – | MNP | – |
| 972 | 55 | Forwarding prohibited | – |

FIG.3

| MMC | MNC | Type | Domain name |
|---|---|---|---|
| 234 | 15 | Forwarding allowed | mmse.vvvvvvvv.co.uk |
| 234 | 30 | Forwarding prohibited | – |
| 440 | 20 | Forwarding allowed | mmse.vvvvvvvv.ne.jp |

FIG.4

| Domain name | Address type | Example |
|---|---|---|
| mmse.xxxx.je | E.164 international number | 819012345678 |
| mmse.xxxx.kr | E.164 domestic number "TYPE=PLMN" | 9012345678/TYPE=PLMN |
| xxxx.xxxxx.xx | "0" E.164 domestic number | 09012345678 |

FIG.5

MULTIMEDIA MESSAGE SERVICE APPARATUS

This application is the U.S. National Phase under 35 U.S.C. §371 of International Application PCT/JP 2004/003865, filed on Mar. 22, 2004, which claims priority to Japanese Patent Application No. 2003-128739, filed on May 7, 2003. The International Application was published under PCT Article 21(2) in a language other than English.

TECHNICAL FIELD

The present invention relates to a multimedia message service apparatus whereby multimedia messages can be transmitted internationally.

BACKGROUND ART

The latest mobile telephone systems make possible transmission and reception of multimedia messages including static images, video and music. Such multimedia messages can be exchanged between mobile telephones that are equipped to deal with multimedia messages and are capable of transmitting and receiving multimedia messages through the Internet.

Previously, however, only domestic operators have been available for forwarding multimedia messages, so it has not been possible to send multimedia messages internationally.

An object of the present invention is therefore to provide a multimedia message service apparatus capable of transmitting multimedia messages internationally.

DISCLOSURE OF THE INVENTION

In order to achieve the above object, a multimedia message service apparatus according to the present invention comprises: first decision means that, when receiving a multimedia message that has been transmitted, references an international prefix table to decide whether or not the message is to be transmitted internationally to the forwarding destination, based on transmission destination information in the multimedia message; second decision means that, if the first decision means decides that the message is to be transmitted to the forwarding destination, references a first routing table based on the transmission destination information to decide whether or not the forwarding destination supports number portability; first acquisition means that, if the second decision means decides that the forwarding destination does not support number portability, acquires the domain name of the forwarding destination from the transmission destination information by referencing the first routing table; second acquisition means that, if the second decision means decides that the forwarding destination does support number portability, acquires international identification information corresponding to the transmission destination information by inquiring registration means that registers subscriber data and acquires the domain name of the forwarding destination by referencing the second routing table based on the international identification information that has thus been acquired; and forwarding means that forwards the multimedia message to the forwarding destination of the domain name that has been acquired by the first acquisition means or the second acquisition means.

Also, in the multimedia message service apparatus according to the present invention, that the first routing table may comprise information including the country code and the domain name of each operator specified by the operator code and information as to whether or not number portability is supported and the second decision means decides whether or not the forwarding destination operator supports number portability by searching the first routing table using as keys the country code information and operator code information in the transmission destination information.

Furthermore, in multimedia message service apparatus according to the present invention, that the first acquisition means may acquire the domain name of the forwarding destination from the country code information and operator code information in the transmission destination information.

Yet further, in multimedia message service apparatus according to the present invention, the second routing table comprises domain name information for each of the operators specified by the country code information and operator information and the second acquisition means acquires the forwarding destination domain name by searching the second routing table using as keys information identifying the country and information identifying the operator in the international identification information.

According to the present invention, when a call is identified as an international transmission, a decision is made as to whether or not the forwarding destination supports number portability. This is because, if the forwarding destination supports number portability, the forwarding destination cannot be uniquely determined from for example the telephone number constituting the transmission information in the command. Accordingly, if the forwarding destination supports number portability, it is arranged for the international identification information corresponding to the transmission destination information in the multimedia message to be acquired by inquiry and for the forwarding destination to be determined from this acquired international identification information. Also, if the forwarding destination does not support number portability, it is arranged for the forwarding destination to be determined from the transmission destination information. In this way, international transmission of a multimedia message can be achieved.

BRIEF DESCRIPTION OF THE DRAWINGS

FIG. 2 is a view showing an example of an international prefix table in a multimedia message service apparatus according to an embodiment of the present invention;

FIG. 3 is a view showing an example of an MSISDN routing table in a multimedia message service apparatus according to an embodiment of the present invention;

FIG. 4 is a view showing an example of an IMSI routing table in a multimedia message service apparatus according to an embodiment of the present invention; and FIG. 5 is a view showing an example of the definition of address form in a multimedia message service apparatus according to an embodiment of the present invention.

BEST MODE FOR CARRYING OUT THE INVENTION

Figure 1:
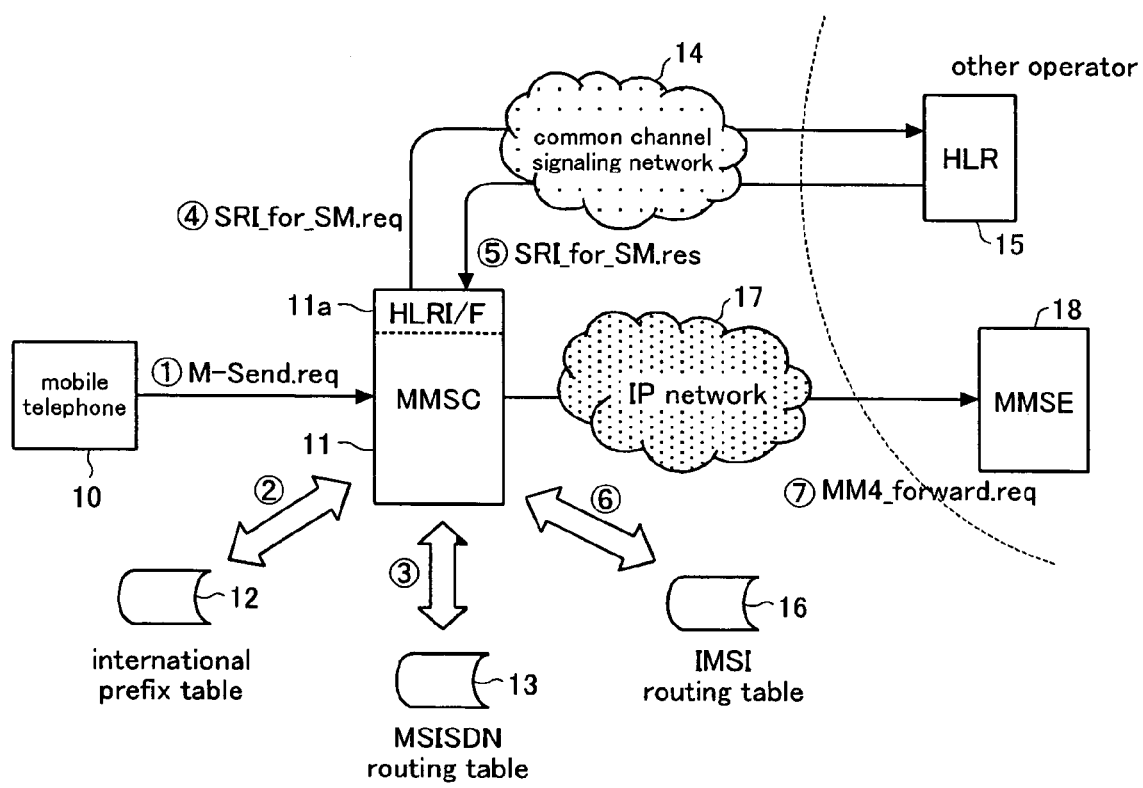
FIG. 1 is a view showing diagrammatically a communication network incorporating a multimedia message service apparatus according to an embodiment of the present invention.

FIG. 1 shows diagrammatically a communication network incorporating a multimedia message service apparatus according to an embodiment of the present invention. Hereinbelow, an MMSC (Multimedia Messaging Service Center) 11 constituting a multimedia message service apparatus according to an embodiment of the present invention will be described with reference to FIG. 1.

In the communication network shown in FIG. 1, a mobile telephone 10, for example a mobile telephone, is assumed to be transmitting a multimedia message. When the mobile telephone 10 transmits the multimedia message, the mobile telephone 10 transmits an M-Send request command, constituting a request to transmit a multimedia message. The MMSC 11 that receives this M-send request command sends an M-Send response command to the mobile telephone 10 and the mobile telephone 10 transmits its multimedia message to the MMSC 11 in response thereto. The MMSC 11 that has received this multimedia message specifies the MMSE (Multimedia Messaging Service Environment) of the forwarding destination to which the multimedia message is to be transferred from the destination MSISDN (Mobile Station ISDN number) in the multimedia message header. For the MMSE, apparatus of the same type as the MMSC 11 is specified.

In specifying the forwarding destination MMSE, first of all the MMSC 11 decides whether the destination MSISDN is an international transmission or not by searching the international prefix table 12 with the entry in the column representing the destination MSISDN prefix in the header of the multimedia message. The MSISDN is the mobile subscriber number that is allocated to the mobile telephone. An example of an international prefix table 12 is shown in FIG. 2; in this international prefix table 12 there are defined three types of international transmission MSISDN prefix, namely, "+", "00", and "010". At this point, if the MMSC 11 decides that the destination MSISDN is not an international transmission, the MMSC 11 forwards the multimedia message to the MMSE of another, domestic, operator that is uniquely determined from the destination MSISDN. Also, if it is concluded from the destination MSISDN that the relevant MMSE is the MMSC 11, since the destination address is found to be local, the MMSC 11 forwards the multimedia message to the mobile telephone corresponding to the destination MSISDN.

On the other hand, if the MMSC 11 finds that the destination MSISDN prefix is one or other of "+", "00" or "010" and that the destination MSISDN is thus an international transmission, the MMSC 11 determines, by searching the MSISDN routing table 13 using as keys the country number and operator code constituted by a few columns at the head of the MSISDN whether or not the operator to which the destination MSISDN belongs supports MNP (Mobile Number Portability). MNP indicates a system whereby the mobile subscriber number that is allocated to a mobile telephone (MSISDN) is unchanged even though the operator to which the mobile telephone is subscribed is changed. Specifically, if MNP is supported, the MSISDN number is carried over when the operator to which the mobile telephone is subscribed is changed. Thus, in the case of a mobile telephone belonging to an operator that supports MNP, there is a risk that this number might be carried over to another operator; it is therefore not possible to uniquely specify the relevant operator from the MSISDN. Also, since an MMSE is established for each operator, the MMSE that is to forward the multimedia message cannot be specified uniquely from the destination MSISDN. It is therefore necessary to ascertain whether or not the operator in question supports MNP.

FIG. 3 shows an example of an MSISDN routing table 13. The MSISDN routing table 13 comprises MNP support information for each operator that is specified by the operator code and country code or for each country that is specified by the country code. In the case of operators that do not support MNP, the domain name information is entered in the Table. For example, in the case of country code "353", the operator specified by the operator code "87" does not support MNP and its domain name is "mmse.xxxx.je". Also, in the case of the country code "82", the operator specified by the operator code "16" does not support MNP and its domain name is "mmse.xxxx.kr". Also, in the case of the country specified by the country code "44", all of the operators in that country support MNP. Further, in the case of the country code "972", the operator specified by the operator code "55" prohibits forwarding of multimedia messages.

As a result of referencing the MSISDN routing table 13 by the MMSC 11 in this way, if it is determined that the operator specified from the destination MSISDN supports MNP, the MMSC 11 generates a SendRoutingInfoForSM (SRI-for-SM) request from the destination MSISDN, and sends this to the HLR 15. This request is transmitted through the HLR interface (HLR I/F) 11a of the MMSC 11 and the common channel signaling network 14 for control signals, and received by the HLR 15. The HLR 15 finds the IMSI (International Mobile Subscriber Identity), which is an international identification number that is allocated to the subscriber of a mobile telephone from the MSISDN included in the SRI-for-SM request that is received, and issues an SRI-for-SM response including the IMSI. The IMSI comprises the MCC (Mobile Country Code), which is a code that identifies the country to which the mobile telephone belongs, the MNC (Mobile Network Code), which is a mobile telephone network code that identifies the operator, and MSIN (Mobile Subscriber Identification Number), which is a code that identifies the subscriber.

The SRI-for-SM response that is generated by the HLR 15 is received by the MMSC 11 through the common signaling channel network 14 and HLR I/F 11a. The MMSC 11 obtains the MNC, which is the mobile telephone network code that identifies the operator and MCC, which is a code that identifies the country to which the destination mobile telephone belongs, from the IMSI included in the received SRI-for-SM response and searches the IMSI routing table 16 using the MCC and MNC as keys to acquire the domain name of the forwarding destination MMSE. FIG. 4 shows an example of an IMSI routing table 16. The IMSI routing table comprises categorized information as to whether or not forwarding of a multimedia message is permitted, for each operator specified by the MMC and MNC, and domain name information of the MMSE of the operators in question. If the domain name that is thus acquired is MMSE 18, the MMSC 11 issues an MM4_forward.req command, which is a request to forward a multimedia message, to the MMSE 18, and, on receipt of an MM4_forward response command from the MMSE 18, forwards the multimedia message to the MMSE 18. These commands and multimedia messages are exchanged through the IP network 17.

Also, if, as a result of the MMSC 11 searching the MSISDN routing table 13 as shown in FIG. 3 using as keys the country code and operator code constituting the first few columns of the MSISDN, it is found that the operator that is specified from the destination MSISDN does not support MNP, the relevant operator can be uniquely specified from the destination MSISDN. Specifically, the domain name of the forwarding destination MMSE is acquired by searching the MSISDN routing table 13 as shown in FIG. 3 using as keys the country code and operator code. If the domain name that is thus acquired is MMSE 18, the MMSC 11 issues an MM4_forward request command constituting a request for forwarding of the multimedia message to the MMSE 18 and, on receipt of an MM4_forward response command from the MMSE 18 forwards the multimedia message to the MMSE 18. These commands and multimedia messages are exchanged through the IP network 17.

It should be noted that, if the operator that is specified from the country code and operator code of the destination MSISDN prohibits forwarding of multimedia messages, or if the operator that is specified by the MCC and MNC in IMSI prohibits forwarding of multimedia messages, an error message to that effect is transmitted by the MMSC 11 to the mobile telephone 10.

As described above, if the MMSC 11 constituting the multimedia message service apparatus according to the present invention concludes that the destination of the multimedia message is an MSISDN beginning with an international prefix, it determines the forwarding destination based on this MSISDN as described above and transmits the multimedia message to the destination MMSE. The origination/destination addresses in the header are then set as follows.

(1) "From:" the address is set by converting the MSISDN obtained on certification of the originator to the following form. "PLMN" (Public Land Mobile Network) indicates the public land mobile network i.e. mobile telephone network.

"+" international number "/TYPE=PLMN"
(example: +819012345678/TYPE=PLMN)

(2) "To:" the address is set by converting the value obtained from the originating mobile telephone to the following form.

"+" international number "/TYPE=PLMN"
(example: +35841234567/TYPE=PLMN)

Let us assume as the form of address that is employed an address in which the forwarding source/forwarding destination domain names are added to the address that is thus set. Specifically, the origination/destination address that is set in "MAIL FROM:" and "RCPT TO:" in SMTP (Simple Mail Transfer Protocol), which is an electronic mail protocol, is for example set as "+819012345678/TYPE=PLMN@mmse.vvvvvvvvv.ne.jp".

Regarding the form of the address, it should be noted that although the form described above has fixed values, these can be set for each forwarding destination MMSE. FIG. 5 shows an example of definition of an address of such a form. As shown in FIG. 5, in the case of an MMSE whose domain name is "mmse.xxxx.je", the form of the address conforms to the E.164 international numbering, which is the international public electrical communication number defined in ITU-T Recommendation E.164. For example, if the domestic number is "9012345678", this is set to the address "819012345678" by adding "81", indicating that this is an international number, at the head. Also, in the case of an MMSE of domain name "mmse.xxxx.kr", the form of the address is set in conformity with E.164 domestic numbering "TYPE=PLMN" with for example a domestic number of "9012345678" to give an address of "9012345678/TYPE=PLMN". Furthermore, in the case of an MMSE of domain name "xxxx.xxxxx.xx" the form of the address is set in accordance with the "0" E.164 domestic numbering with for example a domestic number of "9012345678" to give an address of "09012345678" by the addition of "0" at the head.

Also, the MMSC 11, which is a multimedia message service apparatus according to the present invention, on receiving a multimedia message transferred from another operator, delivers this to the destination mobile telephone. Authentication of the incoming transmission mobile telephone is arranged to be performed by the destination MSISDN then being obtained from the address designated in "RCPT TO:".

Furthermore, on receipt of a Delivery Report indicating delivery of a multimedia message transferred from another operator, the MMSC 11, which is a multimedia message service apparatus according to the present invention, pushes this to the destination mobile telephone. Authentication of the incoming transmission mobile telephone is then arranged to be performed by the destination MSISDN then being obtained from the address designated in "RCPT TO:".

Yet further, the MMSC 11, which is a multimedia message service apparatus according to the present invention, transmits to the originating operator a delivery report in respect of the multimedia message delivered to the destination mobile telephone by forwarding from the other operator.

The return address is taken as the address specified in "MAIL FROM:".

Yet further, the MMSC 11, which is a multimedia message service apparatus according to the present invention, generates an M-read-orig.ind message from the MM4_read_reply_report.REQ, which is the opening report request message received from another operator, and pushes this to the destination mobile telephone. Authentication of the incoming transmission mobile telephone is then arranged to be performed by the destination MSISDN then being obtained from the address designated in "RCPT TO:".

Yet further, the MMSC 11, which is a multimedia message service apparatus according to the present invention, generates an MM4_read_reply_report.RES, which is the opening report response message from the M-read-rec.ind message received from the mobile telephone to which the multimedia message was delivered, and transmits this to the originating operator.

INDUSTRIAL APPLICABILITY

As described above, a multimedia message service apparatus according to the present invention is arranged to determine whether or not the forwarding destination supports number portability on identifying an international transmission. This is because, if the forwarding destination supports number portability, it is not possible to uniquely determine the forwarding destination from for example the telephone number which is the transmission destination information in the command. Accordingly, if the forwarding destination supports number portability, the forwarding destination is arranged to be determined from the international identification information acquired by inquiring the international identification information corresponding to the transmission destination information in the multimedia message. Also, if the forwarding destination does not support number portability, it is arranged for the forwarding destination to be determined from the transmission destination information. In this way, a multimedia message can be sent internationally.

The invention claimed is:

1. A multimedia message service apparatus, comprising:
   first decision means that, when receiving a multimedia message that has been transmitted, references an international prefix table to decide whether or not the message is to be transmitted internationally to a forwarding destination, based on transmission destination information in said multimedia message;
   second decision means that, if the first decision means decides that the message is to be transmitted to the forwarding destination, references a first routing table based on said transmission destination information to decide whether or not the forwarding destination supports number portability;
   first acquisition means that, if the second decision means decides that the forwarding destination does not support number portability, acquires the domain name of the forwarding destination from said transmission destination information by referencing said first routing table;

second acquisition means that, if said second decision means decides that the forwarding destination does support number portability, acquires international identification information corresponding to said transmission destination information by inquiring registration means that registers subscriber data and acquires the domain name of the forwarding destination by referencing a second routing table based on the international identification information that has thus been acquired; and forwarding means that forwards said multimedia message to the forwarding destination of the domain name that has been acquired by said first acquisition means or said second acquisition means.

2. The multimedia message service apparatus according to claim 1, wherein said first routing table comprises information including the country code and the domain name of each operator specified by the operator code and information as to whether or not number portability is supported and said second decision means decides whether or not the forwarding destination operator supports number portability by searching said first routing table using as keys the country code information and operator code information in said transmission destination information.

3. The multimedia message service apparatus according to claim 1, wherein said first acquisition means acquires the domain name of the forwarding destination from country code information and operator code information in said transmission destination information.

4. The multimedia message service apparatus according to claim 1, wherein said second routing table comprises domain name information for each of the operators specified by the country code information and operator information and said second acquisition means acquires the forwarding destination domain name by searching said second routing table using as keys information identifying the country and information identifying the operator in said international identification information.

5. A multimedia message service apparatus, comprising:

a first decision apparatus that, after receiving a multimedia message that has been transmitted, determines if the message is to be transmitted internationally to a forwarding destination based on transmission destination information in the multimedia message;

a second decision apparatus that, if the first decision apparatus determines that the message is to be transmitted internationally to the forwarding destination, references a first routing table based on the transmission destination information to determine if the forwarding destination supports number portability;

a first acquisition apparatus that, if the second decision apparatus determines that the forwarding destination does not support number portability, acquires domain name of the forwarding destination using the transmission destination information and the first routing table;

a second acquisition apparatus that, if the second decision apparatus determines that the forwarding destination does support number portability, acquires international identification information corresponding to the transmission destination information and acquires the domain name of the forwarding destination using the international identification information and a second routing table; and a forwarding apparatus that forwards the multimedia message to the forwarding destination using the domain name of the forwarding destination.

6. The multimedia message service apparatus according to claim 5, wherein the information identifying the forwarding destination includes a domain name.

7. The multimedia message service apparatus according to claim 5, wherein the first routing table includes country code information and domain name information of at least one operator specified by an operator code and information as to whether or not number portability is supported by the forwarding destination.

8. The multimedia message service apparatus according to claim 7, wherein the second decision apparatus determines whether or not the forwarding destination supports number portability by searching the first routing table using country code information and operator code information in the transmission destination information.

9. The multimedia message service apparatus according to claim 5, wherein the first acquisition apparatus acquires the information identifying the forwarding destination using country code information and operator code information in the transmission destination information.

10. The multimedia message service apparatus according to claim 5, wherein the second routing table includes domain name information for each operator specified by country code information and operator code information.

11. The multimedia message service apparatus according to claim 10, wherein the second acquisition apparatus acquires the information identifying the forwarding destination by searching the second routing table using information identifying the country and information identifying the operator in the international identification information.

12. The multimedia message service apparatus according to claim 5, wherein the second acquisition apparatus acquires the international identification information by querying a register that registers subscriber data.

13. A method for servicing multimedia messages, comprising:

receiving a multimedia message that has been transmitted;

determining if the message is to be transmitted internationally to a forwarding destination based on transmission destination information in the multimedia message;

if it is determined that the message is to be transmitted internationally to the forwarding destination, referencing a first routing table based on the transmission destination information to determine if the forwarding destination supports number portability;

if it is determined that the forwarding destination does not support number portability, acquiring domain name of the forwarding destination using the transmission destination information and the first routing table;

if it is determined that the forwarding destination does support number portability, acquiring international identification information corresponding to the transmission destination information and acquiring the domain name of the forwarding destination using the international identification information and a second routing table; and forwarding the multimedia message to the forwarding destination using the domain name of the forwarding destination or the international identification information.

14. The method according to claim 13, wherein the information identifying the forwarding destination includes a domain name.

15. The method according to claim 13, wherein the first routing table includes country code information and domain name information of at least one operator specified by an operator code and information as to whether or not number portability is supported by the forwarding destination.

16. The method according to claim 15, wherein determining whether or not the forwarding destination supports number portability includes searching the first routing table using country code information and operator code information in the transmission destination information.

17. The method according to claim 13, wherein acquiring information identifying the forwarding destination using the transmission destination information and the first routing table includes using country code information and operator code information in the transmission destination information.

18. The method according to claim 13, wherein the second routing table includes domain name information for each operator specified by country code information and operator code information.

19. The method according to claim 18, wherein acquiring the information identifying the forwarding destination using the international identification information and the second routing table includes searching the second routing table using information identifying the country and information identifying the operator from the international identification information.

20. The method according to claim 13, wherein acquiring the international identification information includes querying a register that registers subscriber data.

* * * * *